United States Patent [19]

Ganmukhi et al.

[11] Patent Number: 5,953,314
[45] Date of Patent: Sep. 14, 1999

[54] CONTROL PROCESSOR SWITCHOVER FOR A TELECOMMUNICATIONS SWITCH

[75] Inventors: Mahesh N. Ganmukhi, Carlisle; Ronald Louis Baracka, Jr., Hudson; Michael P. DeMilia, Sterling, all of Mass.; John Peter Prokopik, Auburn, N.H.

[73] Assignee: Ascend Communications, Inc., Westford, Mass.

[21] Appl. No.: 08/919,828

[22] Filed: Aug. 28, 1997

[51] Int. Cl.⁶ .................................................. G06F 13/00
[52] U.S. Cl. ............................................. 370/220; 370/400
[58] Field of Search ................................... 370/217, 218, 370/219, 220, 227, 400, 254

[56] References Cited

U.S. PATENT DOCUMENTS

5,422,880  6/1995  Heitkamp et al. ...................... 370/400
5,729,685  3/1998  Chatwani et al. ...................... 370/254

*Primary Examiner*—Chi H. Pham
*Assistant Examiner*—Maikhanh Tran
*Attorney, Agent, or Firm*—Weingarten, Schrugin, Gagnebin & Hayes LLP

[57] ABSTRACT

First and second control processor cards are employed in conjunction with first and second switch fabric cards to interconnect Input/Output cards in a telecommunications switch. The control processor cards provide a portion of the functionality previously associated with switch fabric cards, such as exertion of control over allocation of bandwidth within the switch. The control processor cards also provide new functionality. In particular, each control processor card can configure both switch fabric cards. Redundant control processor cards and redundant switch fabric cards are employed to provide a switch that is less susceptible to failure than switches with only redundant switch fabric cards. Hence, failure of a control processor card and a switch fabric card can be sustained without resulting in switch failure. Timing control functions may also be provided by a separate timing module card.

34 Claims, 4 Drawing Sheets

Fig. 5

CONTROL PROCESSOR SWITCHOVER FOR A TELECOMMUNICATIONS SWITCH

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention is generally related to telecommunications switches, and more particularly to high reliability telecommunications switches employing redundant control systems.

Telecommunications switches facilitate routing and transmission of data in telecommunications networks. Such switches typically include a plurality of Input/Output ("I/O") cards which are interconnected through a switch fabric card. In particular, the switch fabric interconnects each I/O card with every other I/O card such that a data unit received at any I/O card can be transmitted to any other I/O card in the switch.

In addition to interconnecting the I/O cards, the switch fabric may function to control timing operations within the switch and allocate bandwidth to connections through the I/O cards such that collisions are avoided. Such functionality is relatively complex to implement, and consequently switch fabric cards in a telecommunications switch are prone to failure. In particular, control functions that are heavily software dependent are prone to failure due to software bugs. Such bugs may be triggered by specific sequences of events so the card can at times be restored through a reset operation. However, data can be lost in such a reset operation.

To avoid data loss and switch failure due to a switch fabric card failure it is known to employ redundant switch fabric cards. In particular, it is known to install a plurality of switch fabric cards in a single switch so that a standby switch fabric card can be employed in the event that the active switch fabric card fails. However, switch fabric cards are generally high cost items and it is therefore common practice to install only one standby switch fabric card, which may not provide sufficient reliability.

BRIEF SUMMARY OF THE INVENTION

In accordance with the present invention, a control processor card is employed in conjunction with a switch fabric card to interconnect Input/Output ("I/O") cards and control switch operation. The control processor card provides a portion of the functionality previously associated with switch fabric cards, such as exertion of control over allocation of bandwidth within the switch and also includes additional control and configuration functionality for a plurality of switch fabric cards, timing module cards and other core switch functions.

In the preferred embodiment first and second control processor cards are employed with first and second switch fabric cards and first and second timing control cards. Redundant control processor cards and redundant switch fabric cards are employed to provide a switch that is less susceptible to failure than switches with only redundant switch fabric cards. Both active and standby control processor cards are coupled to active and standby switch fabric cards although only the active control processor card is used to control the switch fabric and other core functions at any given time. Upon failure of the active control processor card, the standby control processor card becomes the active control processor card and the new standby card is reset or removed for repair.

Previously known switch fabric cards perform several complex functions including allocation of bandwidth, interconnection of I/O cards and timing control. Such functions are software intensive and are generally more prone to failure than other portions of the switch. Failure of any one such function may result in failure of the entire switch fabric card. The present invention localizes failure of such functions by associating performance of those functions with separate cards. Further, by employing redundancy in the control processor card, timing control modules and the switch fabrics, control processor card switchover may be accomplished using either switch fabric as the active switch fabric or either timing control module as the active timing control module.

BRIEF DESCRIPTION OF THE DRAWING

The invention will be more fully understood in view of the following Detailed Description of the Invention, in conjunction with the Drawing, of which.

DETAILED DESCRIPTION OF THE INVENTION

Figure 1:
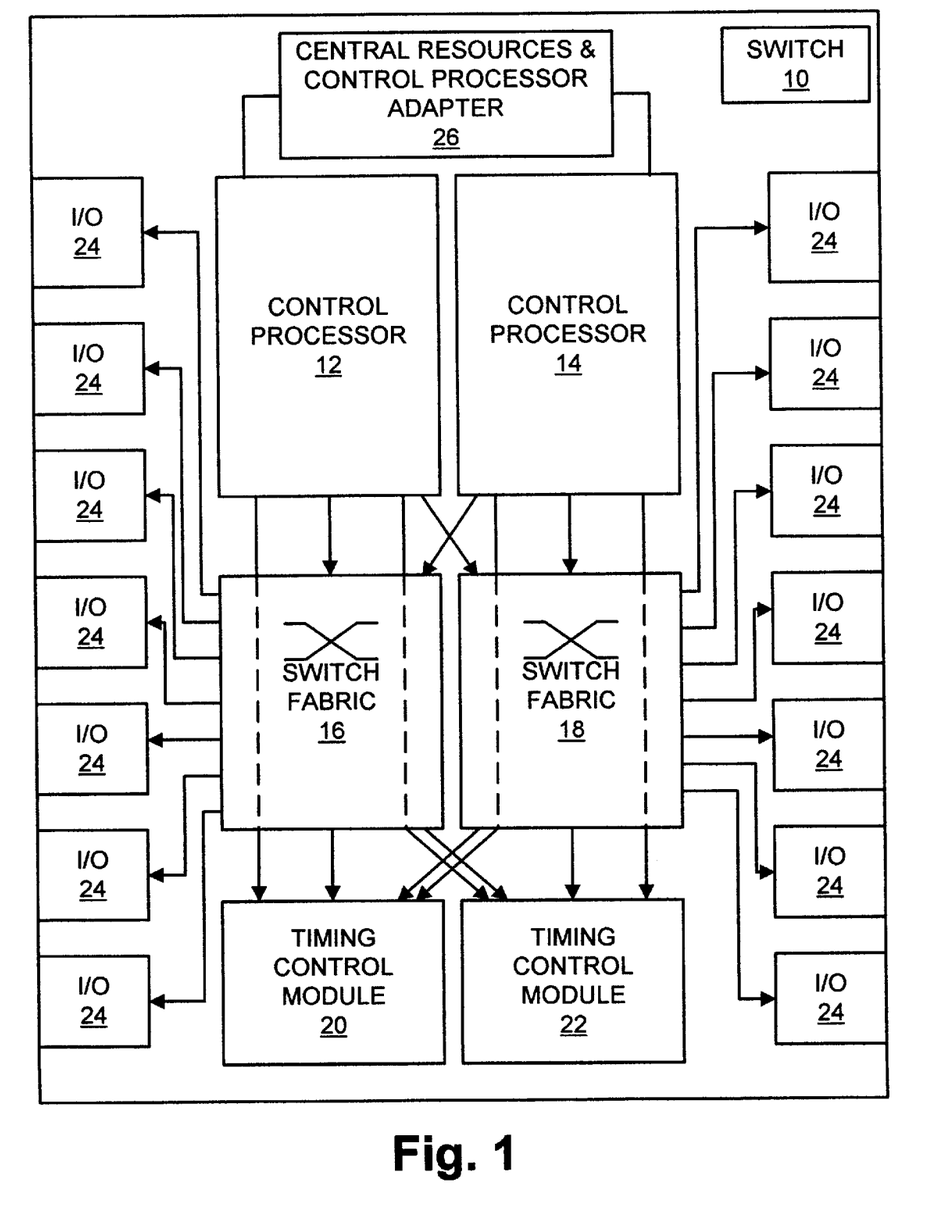
FIG. 1 is a block diagram of a telecommunications switch.

FIG. 1 illustrates a telecommunications switch 10 having two control processor cards 12, 14, two switch fabric cards 16, 18, two timing control module cards 20, 22 and a plurality of Input/Output ("I/O") cards 24. All of the cards are interconnected for complete interoperability. The I/O cards 24 are interconnected through both switch fabric cards 16, 18 in a crossbar configuration such that a data unit that is received at any one of the I/O cards 24 can be transmitted to any other I/O card, regardless of which switch fabric card is in active use. Similarly, both of the control processor cards are each coupled to both of the switch fabric cards and both of the timing control cards. The control processor cards are interconnected through shared control signals to a set of central switch resources 26.

The control processor cards 12, 14 function to configure the switch fabric cards, monitor the state of the switch, control switch fabric switchover and control switch resources. One particular resource that is controlled by the control processor cards is the bandwidth within the switch fabric. The switch fabric cards function to interconnect the I/O cards. The timing control module cards provide clock signals and control timing within the switch. The I/O cards provide an interface to other devices and may be configured to facilitate communication with specific protocols and connection types such as frame relay, Asynchronous Transfer Mode ("ATM"), Ethernet, Fiber Distributed Data Interface, token ring, Integrated Services Digital Network and T1.

Figure 2:
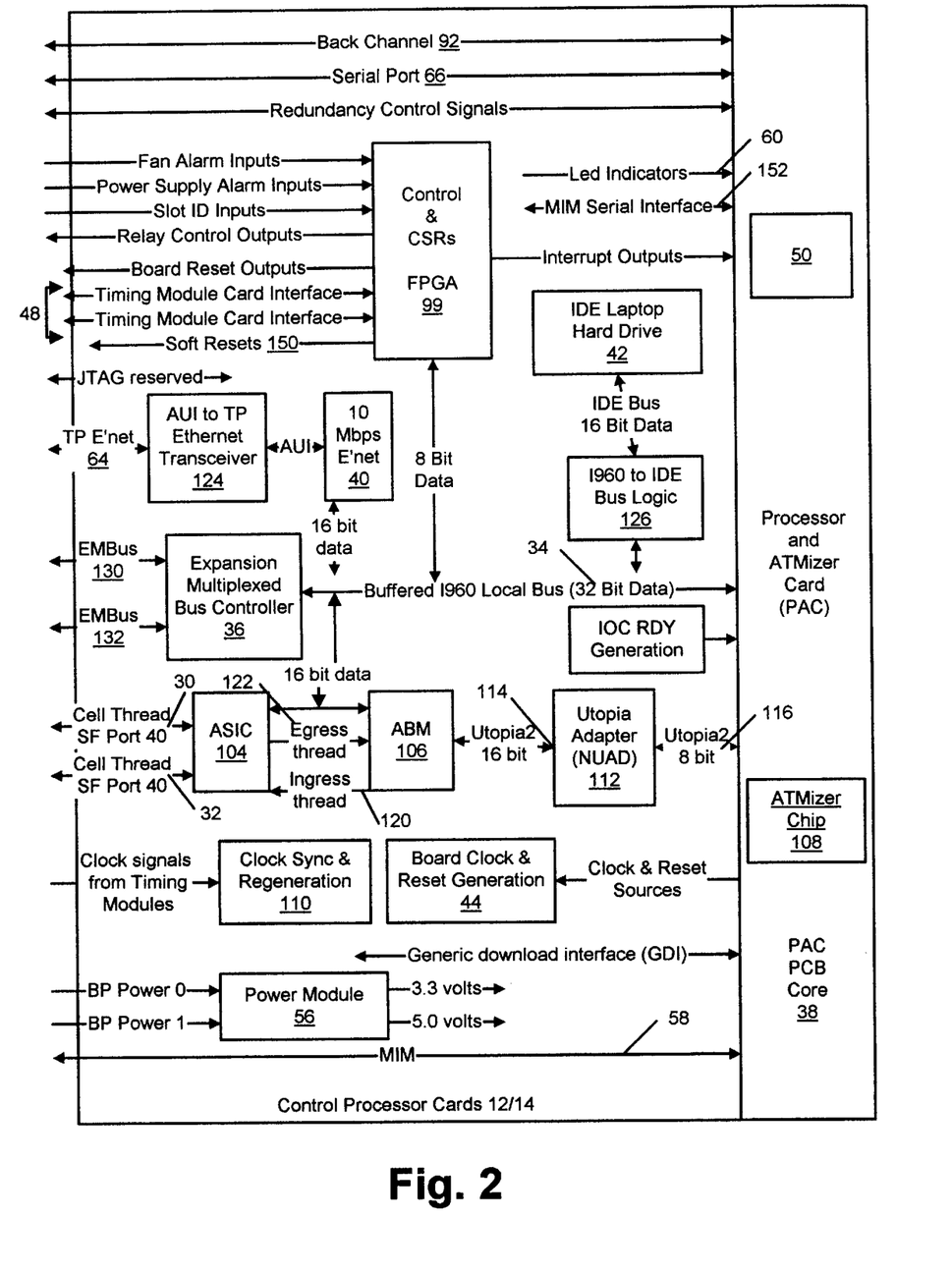
FIG. 2 is a block diagram of the control processor card of FIG. 1.

Referring to FIGS. 1 and 2, each control processor card 12, 14 includes redundant cell thread interfaces 30, 32 to the switch fabric cards 16, 18, an I960 bus interface 34 to an I960HD Processor and ATMizer Control ("PAC") 38, a 10 Mbps Ethernet interface controller 40, a hard drive 42, selective reset logic 44, a redundant expansion bus 46 connected to the switch fabric cards, an interface 48 to the timing control module cards, interrupt logic 50 to sum indirect interrupts, and interface 52 to microprocessor ports of internal Application Specific Integrated Circuits ("ASICs"), support for a redundant control processor cards, power module 56, Module Identification Memory ("MIM") interface 58, Light Emitting Diode ("LED") indicators 60 and test logic 62.

When the switch is powered-ON or reset, only one of the control processor cards 12, 14 can become active. The non-active control processor card is considered to be in standby mode. An active control processor card is distinguished from a standby control processor card by having exclusive control over central resources and internal resources including the Management Ethernet port 64, Management RS232 port 66, MIM interface 58 (through which revision numbers and other information can be retrieved from cards in the switch), timing module board microprocessor interface bus, switch fabric board microprocessor interface bus, selective resets to other system boards, timing module FPGA download interface, switch fabric switchover synchronization backplane signal (SYNC_TM), BIO expansion bus strobe backplane signal, Power and Fan test signals, Buzzer relay and External alarm relays, none of which are implemented on the control processor cards. These resources are not critical to operations of existing ATM connections, and the resources can be unavailable for the time required to execute a control processor card switchover operation without causing switch failure. Similarly, one switch fabric and one timing control module will be in the active mode during operation, while the non-active switch fabric card and timing control module will be in a standby mode.

Figure 3:
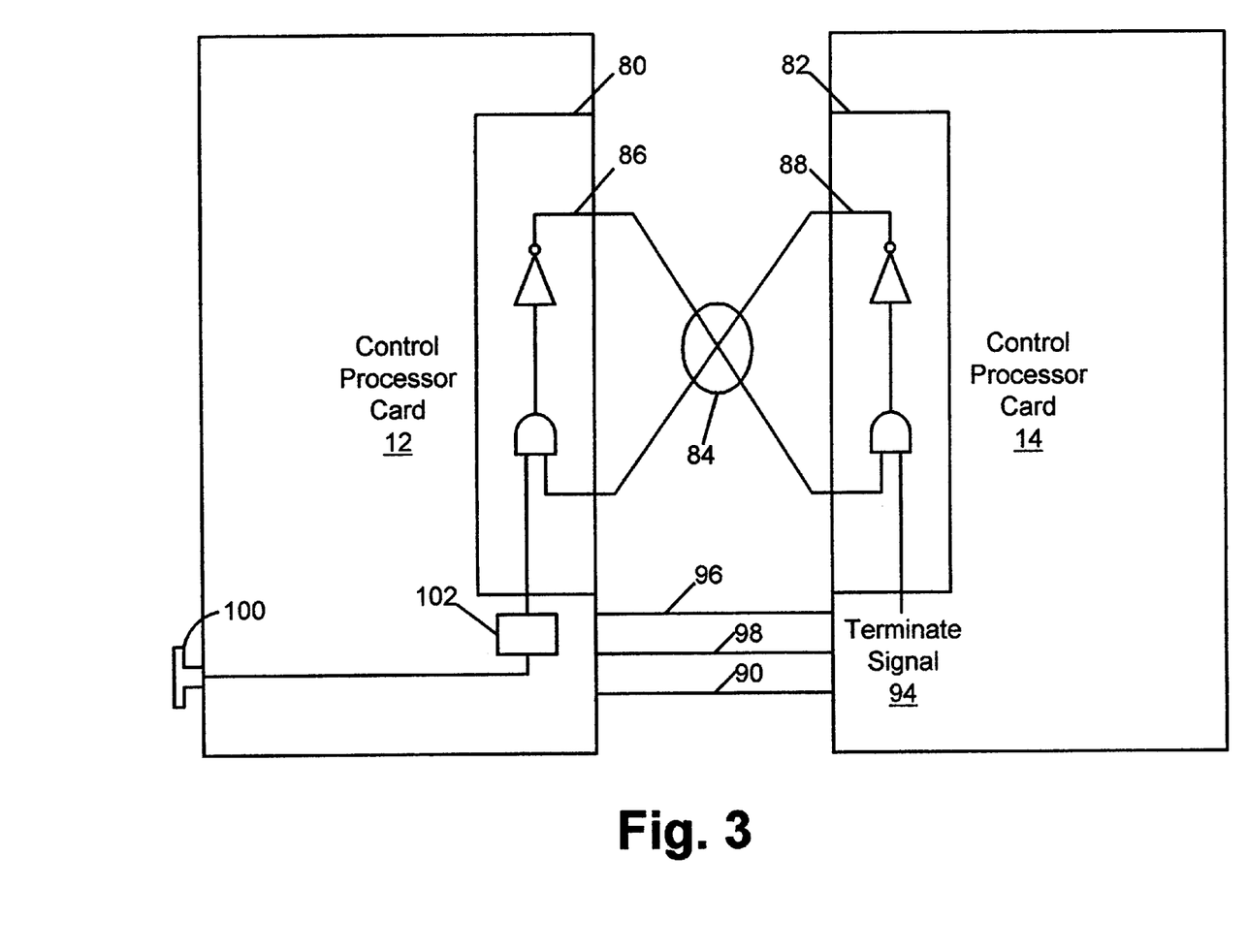
FIG. 3 is a block diagram of a bistable latch.

Referring to FIGS. 2 and 3, to implement redundancy the control processor cards 12, 14 can "switchover" between active and standby modes so that a faulty control processor card can fail and be replaced by the standby control processor card without disrupting data flow. A bistable latch is formed with inverter type latch halves 80, 82 implemented on each control processor card. The latch halves are cross-coupled through a backplane connector 84, and latch logic ensures that different logic levels are maintained at respective state indicator nodes 86, 88 on each control processor card. Relatively little hardware is used in the cross coupled latch to reduce the probability of failure in the bistable latch itself. Software may be employed to ensure that the standby control processor is functioning properly before allowing the switchover operation.

At power-ON the latch resolves the online state, i.e., active or standby, of each control processor card. This state is resolved randomly at power-ON. The online state of the control processor card is employed within a few logic gate delays to control tri-stating of the central resources 26. In particular, the standby control processor card tri-states (at high impedance) any hardware buffers involved in the access of the central resources to avoid interference with the operation of the active control processor.

The active control processor card periodically transmits an "active" or "keep alive" indicator signal 90 to the standby control processor card. The standby control processor monitors the state of the active control processor by receiving the "active" signals from the active control processor through a dedicated backplane channel ("backchannel") 92. If the active control processor fails to send an "active" indicator signal, the standby control processor responds as though the active control processor is faulty. In particular, the standby control processor begins termination of the active control processor by generating a "terminate" signal 94. The terminate signal toggles the state of the cross-coupled bistable latch.

Following the state change caused by the terminate signal the active control processor tri-states access to internal and central resources. A non-maskable interrupt ("NMI") is then sent to the main processor unit. The processor unit in the active control processor card operates for approximately 40 ms following receipt of the terminate signal 94 to clean up operations and store current state information to non-volatile storage, at which point the standby control processor becomes active and the formerly active control processor card is reset. Following the reset cycle the terminated control processor card assumes standby status. The standby control processor can then be physically removed from the switch for diagnostic testing, repair or replacement.

During the control processor switchover operation any microprocessor transactions in progress in the active timing module and active switch fabric interface are completed before tri-stating is implemented. For example, microprocessor non-burst read/write cycles of single header fields are finished before tri-stating. The timing module FPGA download may be interrupted by the control processor switchover, in which case a "NOT DONE" status signal is generated to indicate an incomplete FPGA program cycle to the new active control processor. Multiple microprocessor transactions are necessary to access the MIMs and for FPGA downloading. Consequently, transactions in progress to the MIMs may cause the target MIM to be in an inconsistent state and cleanup following switchover may be necessary. Tri-state control of the state of the Management Ethernet port, RS232 port, BIO expansion strobe, power/fan test signals, and selective reset strobes may be in an indeterminate state briefly during the switchover. However, the target resource in each case is insensitive to the brief indeterminate state. Relay controls revert to default values on the new active control processor and require reinitialization.

When a control processor card is reset, the online status of that card is forced to be in the standby state. This precaution ensures that the card is held in the standby state when plugged into the switch without powering-down, i.e., "hot-plugging." The precaution is necessary because it is otherwise possible for one side of the cross-coupled latch to power-ON before the signal connector pins to the other side of the cross-coupled latch on an already connected and active control processor have mated. When the control processor is fully connected to the backplane connector a slide latch on the front of the card may be used to take the card out of reset. Upon release of the slide latch reset the control processor card retains the standby state if the card has been mated with the active control processor. If there is only one control processor installed in the switch then that control processor card will come out of reset in the active state.

Pulling a slide latch 100 on an active control processor card into a position where the card can be removed from the card cage generates a NMI to the main processor unit 102 on the control processor card. About 40 ms after receipt of the NMI the control processor card is reset. Since reset forces the control processor into the standby state, the other control processor card will enter the active state. For the case of a slide latch reset causing a control processor card switchover, software functions control shutting-down of central and internal resources, in contrast with the immediate disconnect caused by a faulty control processor card as described above.

The control processor card is illustrated in greater detail in FIG. 2. The cell thread interfaces 30, 32 connect the control processors to a single port on each respective switch fabric card. In the present embodiment, the cell processor cards employ port 40 of a 40×40 switch fabric. This port is not shared with any I/O card. The interface employs interface logic 104, a buffer management chip 106, and an ATMizer chip 108. A 100 Mhz clock that is locked to a clock signal provided by the active timing module card through clock sync and regeneration logic 110, is generated for the interface logic 104 by board clock logic 44. The control processor card also includes an FPGA based control processor Utopia Adapter 112 with a bidirectional single ATM cell deep FIFO memory to match a 16-bit, 50 Mhz Utopia level-2 bus 114 of the buffer management chip to an 8-bit, 50 Mhz, Utopia level-2 bus 116 of the ATMizer chip 108.

The ATMizer 108 on the PAC 38 sends ATM cells to the thread interface and receives ATM cells from the thread interface over the Utopia2-PAC interface. The Utopia2-PAC interface connects between the Utopia adapter 112 and the ATMizer 108 and includes two 8-bit point-to-Point busses with associated control logic. One bus accommodates an ingress thread 120 and one bus accommodates an egress thread 122. These busses exchange data at 50 Mhz through a connection between the PAC and control processor.

The Ethernet controller 40 is programmed and accessed as a slave device via an I960 local bus. Both control processor cards in the switch provide a twisted pair Ethernet interface 64 through transceiver 124. A relay selects the Ethernet interface from the active control processor card to connect to a single RJ45 connector on the Control Processor Adapter ("CPA").

The control processor card includes a 2.5" ATA-2 (EIDE) laptop hard drive 42 which is accessed via the I960 local bus 34 through bus logic 126. The control processor may also support a 175 Mbyte FLASH drive as an alternative to the hard drive.

All cards may be reset by the control processor via individual reset lines on the backplane. Selective reset logic on the control processor decodes writes to a selective reset register. The writes are seen on the I960 bus and cause the assertion of appropriate reset lines to selected cards.

Figure 4:
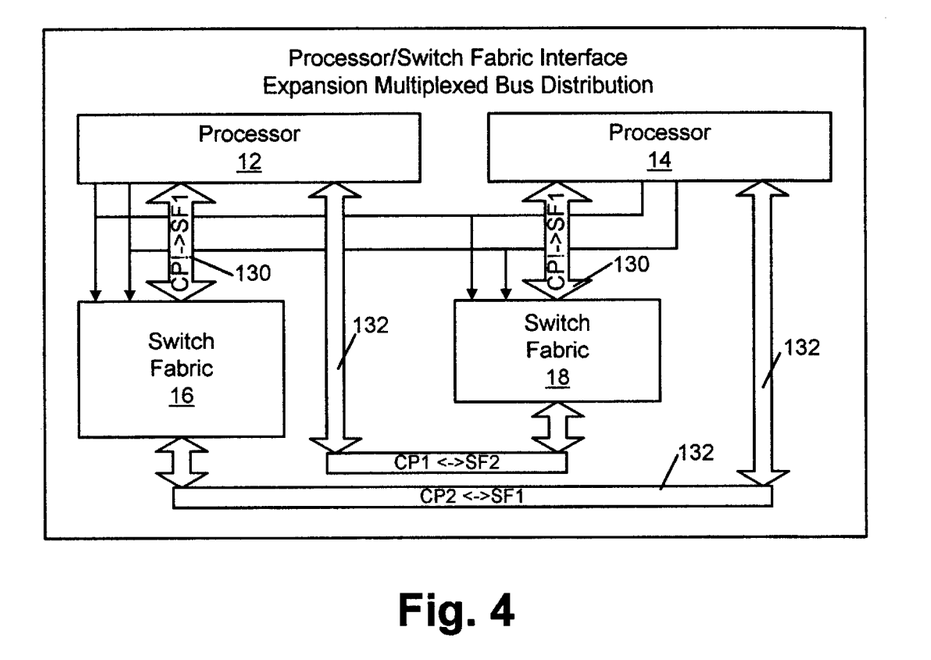
FIG. 4 is a block diagram of the control processor busses of FIG. 1.

Referring to FIGS. 2 and 4, each control processor card employs two 8-bit multiplexed 33 MHz synchronized busses ("EMBusses") 130, 132. EMBus 130 of control processor card 12 connects to switch fabric 16 and EMBus 132 of control processor card 12 connects to switch fabric 18. Similarly, EMBus 130 of control processor card 14 connects to switch fabric 18 and EMBus 132 of control processor card 14 connects to switch fabric 16. The EMBusses associated with each respective control processor card are independent of the other control processor cards to reduce the impact of bus failure. The EMBusses support connection to microprocessor interfaces within the switch. Multiplexing permits a lower pin count on the backplane. Since each EMBus is synchronous, bus clocks on the switch fabric and control processor cards are synchronized to each other. Further, all EMBus clock outputs from each control processor to each switch fabric have matched and specified lengths on the backplane.

The following signals are employed on the EMBusses:

EMBClk: EMBus Clock provides timing for all transaction on the EMBus. All bus signals are synchronous and sampled on the rising edge of EMBClk. The EMBClk frequency is 33 Mhz. This clock is driven by the control processor.

BCYCLE_L: Bus Cycle Low is driven by the control processor to indicate the duration of a complete bus transaction. BCYCLE_L is asserted at the beginning of each bus cycle in conjunction with a first addressing phase. BCYCLE_L is deasserted prior to last data transfer, thereby signaling the termination of the transfer cycle is imminent upon completion of the data transfer. Deassertion of BCYCLE_L is also intended to reset slave bus controllers assuring synchronization of future bus transactions.

AD: The Address and Data on the EMBus are multiplexed on the same pins. Address is asserted on the bus during the first one/two EMBClk cycles following the BCYCLE_L going low. Address is asserted in LSB/MSB order. After the addressing phase, the Data bus is turned around if necessary. In the case of a control processor write cycle, Data is asserted immediately following the address phase. In the case of a control processor read cycle, the Switch Fabric asserts data onto the bus in conjunction with asserting SXRDY_L.

WR_L: Read/Write Low is asserted on the bus during the first address cycle and is held active throughout the complete bus cycle. A Read cycle occurs when WR_L is low, and a write is indicated when high.

SXRDY_L: Slave Transfer Ready is driven low in conjunction with the switch fabric driving valid data in the case of a control processor or when the switch fabric is ready to accept data in the case of a primary control processor write.

EMBINT_L [1:0]: Expansion Mux Bus Interrupt Lines. These signal the host processor that an interrupt is pending.

An EMBus cycle has three phases. Phase 1, parts a and b, commence a bus transfer cycle at which address transfers take place. In Phase 2 the bus turns around, if needed, during the read cycle. In Phase 3 data transfers take place. Phases and data transfers on the EMBusses are synchronously controlled. BCYCLE_L delineates a transfer cycle by marking the beginning and pending termination of a complete cycle. SXRDY_L indicates the slave is ready to transmit or receive data.

An EMBus write cycle begins with the assertion of BCYCLE_L and WR_L asserted high. Addressing occurs for two cycles. Immediately following addressing, the data phase of bus operations takes place. Termination of the WRITE cycle concludes with SXRDY_L asserted followed by BCYCLE_L deassertion.

An EMBus read cycle begins with the assertion of BCYCLE_L low during which WR_L asserted low. Addressing occurs for two cycles. Immediately following the addressing phase, the bus turnaround phase is instituted. Immediately following addressing, the data phase of bus operations takes place. Data is placed on the AD bus in conjunction with SXFRDY_L. Deassertion of BCYCLE_L terminates the READ cycle.

Figure 5:
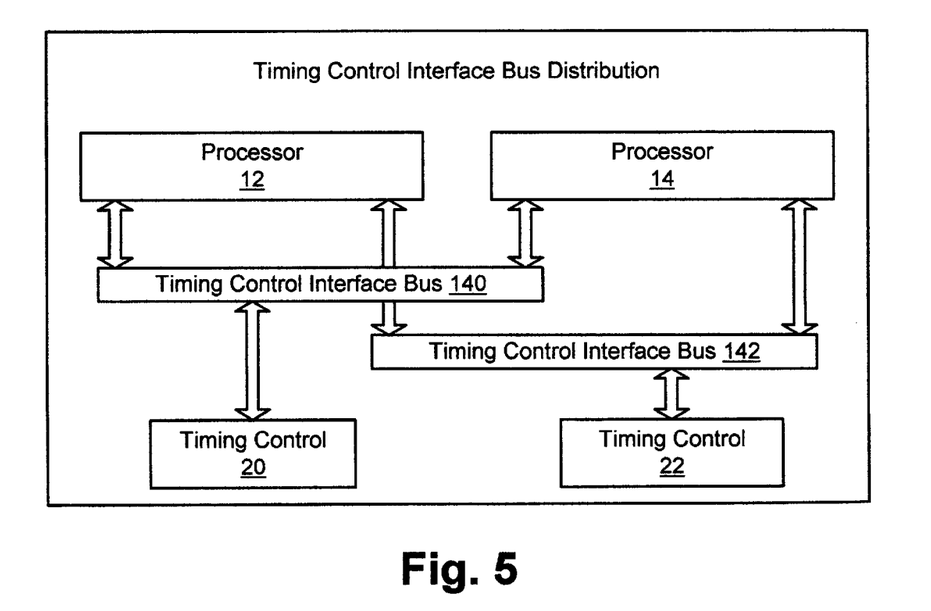
FIG. 5 is a block diagram of the timing control interface busses of FIG. 1.

Referring now to FIG. 5, each control processor 12, 14 in the network switch also provides interface busses 140, 142 to the timing modules 20, 22. Only the active control processor is capable of sending-to or receiving-from either of these busses. The standby control processor is isolated, by tri-stating at high impedance, so as not to interfere with communications over the busses involving the active control processor card.

Referring to FIGS. 2 and 5, the control processor supports eight bidirectional data signals (in EMBusses 130, 132), address outputs (in timing module interface 48), chip selects (on the I960 bus 34), a soft reset output 150, an interrupt input (on the timing module and switch fabric interfaces), and FPGA download connection for each timing module bus (through the timing module interface 48). Relays on the CPA connect the active control processor to buzzer control, the Ethernet network management port, and alarm contact closures. Both control processor cards share an RS232 port 66 which provides connection to the PAC. The active PAC interfaces to the MIM via a MIM signal path 58. The control processor card receives digital alarm/status signals from the AC to DC central power modules that generate −48V for the system. Both control processor cards redundantly supply power to the CPA.

The control processor card collects interrupts from various sources including the timing modules, the disk drive, the Ethernet port, the interface logic 104, the buffer management chip 106, fan and power supply alarms. Each interrupt source is returned to the PAC. The control processor provides masking, steering, and status registers for the various interrupt sources.

The power module 56 receives distributed power from the backplane and outputs regulated 3.3 V and 5 V power for components on both the PAC 38 and the control processor card. The power module also facilitates "hot-plugging" and removal of the control processor card and receives redundant power feeds from the backplane so that the control processor card can continue operation should one of the feeds fail.

The control processor includes an internal MIM device that is accessed via a MIM interface 152 from the PAC. The control processor card also includes eight external MIM interfaces to the timing modules, switch fabric cards, the power subsystem and the backplane. Only the active control processor controls these MIM interfaces. The standby control processor is isolated from the MIM interfaces. The control processor card is generally designed for in-circuit testability. IEEE 1149.1 boundary scan ports on components may be used to enhance manufacturing test or support In System Programmability ("ISP") for Programmable Logic Devices ("PLDs") as needed. IEEE standard Test Action Group pins are reserved on the connectors between the PAC and the Backplane, but are not presently used.

Having described the preferred embodiments of the invention, other embodiments which incorporate the concepts of the presently disclosed invention will be apparent to those of ordinary skill in the art. Therefore, the invention should not be viewed as limited to the disclosed embodiments but rather should be viewed as limited only by the spirit and scope of the appended claims.

What is claimed is:

1. A telecommunications switch, comprising:
   a plurality of interface modules;
   a plurality of interconnection modules connected to said interface modules, said interconnection modules providing physical connections between individual interface modules; and
   a plurality of control modules, each of said plurality of control modules interconnected with each one of said interconnection modules, wherein each of said plurality of control modules is operative to allocate bandwidth within each of said interconnection modules.

2. The switch of claim 1 including an active control module and a standby control module.

3. The switch of claim 2 including an active interconnection module and a standby interconnection module.

4. The switch of claim 3 wherein each said control module is disposed on a separate respective printed circuit board.

5. The switch of claim 4 wherein each said interconnection module is disposed on a separate respective printed circuit board.

6. The switch of claim 5 wherein the standby control module is automatically activated upon failure of the active control module.

7. The switch of claim 6 wherein the standby interconnection module is automatically activated upon failure of the active interconnection module.

8. A telecommunications switch, comprising:
   a plurality of interface modules;
   a plurality of interconnection modules connected to said interface modules, said interconnection modules providing physical connections between individual interface modules, said interconnection modules including an active interconnection module and a standby interconnection module, wherein said standby interconnection module is automatically activated upon failure of the active interconnection module, and wherein each of said plurality of interconnection modules is disposed on a separate respective printed circuit board,
   a plurality of control modules operative to configure the interconnection modules, wherein said plurality of control modules include an active control module and a standby control module, wherein said standby control module is automatically activated upon failure of said active control module, wherein each of said plurality of control modules is disposed on a separate respective printed circuit board, wherein each control module includes a latch portion that controls switch state, the active control module latch portion combining with the standby control module latch portion to provide a bistable latch that prevents the control modules from being simultaneously active.

9. The switch of claim 8 wherein the control modules are mounted in a card cage in the switch, and wherein removal of the active control module from the card cage automatically activates the standby control module.

10. A method for transmitting data associated with data channels in a telecommunications switch having a plurality of interface modules, comprising the steps of:
    providing physical connections between individual interface modules with a plurality of interconnection modules;
    configuring the interconnection modules with at least one of a plurality of control modules; and
    allocating the physical connections provided by the interconnection module to data channels formed through the switch with the at least one control module, wherein each of said plurality of control modules are interconnected to each of said interconnection modules, and wherein each of said plurality of control modules is operative to allocate bandwidth within each of said interconnection modules.

11. The method of claim 10 wherein first and second control modules are employed and including the further step of designating the first control module as an active control module and designating the second control module as a standby control module.

12. The method of claim 11 wherein first and second interconnection modules are employed and including the further step of designating the first interconnection module as an active interconnection module and designating the second interconnection module as a standby interconnection module.

13. The method of claim 12 wherein each said control module is located on a separate respective printed circuit board.

14. The method of claim 13 wherein each said interconnection module is located on a separate respective printed circuit board.

15. The method of claim 14 including the further step of automatically activating the standby control module upon failure of the active control module.

16. The method of claim 15 including the further step of automatically activating the standby interconnection module upon failure of the active interconnection module.

17. A method for transmitting data in a telecommunications switch, comprising the steps of:

providing physical connections between individual interface modules with a plurality of interconnection modules;

configuring the interconnection modules with at least one of a plurality of control modules;

allocating the physical connections provided by the interconnection module to data channels formed through the switch with the at least one control module;

designating a first control module as an active control module and designating a second control module as a standby control module;

designating a first interconnection module as an active interconnection module and designating a second interconnection module as a standby interconnection module;

automatically activating the standby control module upon failure of the active control module;

automatically activating the standby interconnection module upon failure of the active interconnection module; and wherein each control module includes a latch portion that controls switch state, and including the further step of combining the active control module latch portion with the standby control module latch portion to provide a bistable latch that prevents the control modules from being simultaneously active.

18. The method of claim 17 wherein the control modules are mounted in a card cage in the switch, and including the further step of automatically activating the standby control module upon removal of the active control module from the card cage.

19. A telecommunications switch for transmitting data associated with data channels, comprising:

at least two switch fabric modules each having a plurality of inputs and outputs, one of said two switch fabric modules being in an active state and the remaining ones of said switch fabric being in a standby state;

at least two control processor modules, one of said control processor modules being in an active state and the remaining ones of said control processor modules being in a standby state, each of said at least two control modules being electronically coupled to each of said at least two switch fabric modules, wherein each of said at least two control processor modules is operative to allocate bandwidth in each of said at least two switch fabric modules; and said active control processor module being operative to configure said first and second switch fabric modules, and wherein the active one of said switch fabric modules is operative to forward data units from said switch fabric module inputs to said outputs.

20. The switch of claim 19 wherein the switch includes an Ethernet port that is controlled by the active control processor module.

21. The switch of claim 19 wherein the switch includes an RS232 port that is controlled by the active control processor module.

22. A telecommunications switch for transmitting data associated with data channels, comprising:

at least two switch fabric modules each having a plurality of inputs and outputs, one of said two switch fabric modules being in an active state and the remaining ones of said switch fabric being in a standby state;

at least two control processor modules, one of said control processor modules being in an active state and the remaining ones of said control processor modules being in a standby state, each of said at least two control modules being electronically coupled to each of said at least two switch fabric modules;

said active control processor module being operative to configure said first and second switch fabric modules, and wherein the active one of said switch fabric modules is operative to forward data units from said switch fabric module inputs to said output, wherein the switch fabric modules each include a revision identifier stored in memory, and wherein the active control processor module has access to such memory.

23. The switch of claim 19 wherein the standby control processor module is automatically activated upon failure of the active control module.

24. The switch of claim 23 wherein the standby switch fabric module is automatically activated upon failure of the active switch fabric module.

25. The switch of claim 24 wherein each control processor module includes a latch portion that controls switch state, the active control processor module latch portion combining with the standby control processor module latch portion to provide a bistable latch that prevents the control processor modules from being simultaneously active.

26. The switch of claim 25 wherein the control processor modules are mounted in a card cage in the switch, and wherein removal of the active control processor module from the card cage automatically activates the standby control processor module.

27. A method for transmitting data associated with data channels in a telecommunications switch, comprising the steps of:

setting one of two switch fabric modules in an active state and the other of said two switch fabric modules in a standby state, each switch fabric module having a plurality of inputs and outputs;

setting one of at least two control processor modules in an active state and the remaining ones of said at least two control processor modules in a standby state, each of said at least two control processor modules being electronically coupled to each of said at least two switch fabric modules, wherein each of said at least two control processor modules is operative to allocate bandwidth within each of said switch modules;

configuring said first and second switch fabric modules with said active control module; and forwarding data units received at inputs of the active switch fabric module to outputs of said switch fabric module.

28. The method of claim 27 wherein the switch includes an Ethernet port and including the further step of controlling the Ethernet port with the active control processor module.

29. The method of claim 27 wherein the switch includes an RS232 port and including the further step of controlling the RS232 port with the active control processor module.

30. A method for transmitting data associated with data channels in a telecommunications switch, comprising the steps of:

setting one of two switch fabric modules in an active state and the other of said two switch fabric modules in a standby state, each switch fabric module having a plurality of inputs and outputs;

setting one of at least two control processor modules in an active state and the remaining ones of said at least two control processor modules in a standby state, each of said at least two control processor modules being electronically coupled to each of said at least two switch fabric modules;

configuring said first and second switch fabric modules with said active control module; and forwarding data units received at inputs of the active switch fabric module to outputs of said switch fabric module wherein the switch fabric modules each include a revision identifier stored in memory, and including the further step of accessing at least one such identifier with the active control processor module.

31. The method of claim 27 including the further step of automatically activating the standby control processor module upon detection of failure of the active control module.

32. The method of claim 31 including the further step of automatically activating the standby switch fabric module upon detection of failure of the active switch fabric module.

33. A method for transmitting data associated with data channels in a telecommunications switch, comprising the steps of:

setting one of two switch fabric modules in an active state and the other of said two switch fabric modules in a standby state, each switch fabric module having a plurality of inputs and outputs;

setting one of at least two control processor modules in an active state and the remaining ones of said at least two control processor modules in a standby state, each of said at least two control processor modules being electronically coupled to each of said at least two switch fabric module;

configuring said first and second switch fabric modules with said active control module;

forwarding data units received at inputs of the active switch fabric module to outputs of said switch fabric module;

automatically activating the standby switch fabric module upon detection of failure of the active switch fabric module;

automatically activating the standby switch fabric module upon detection of failure of the active switch fabric module; and wherein each control processor module includes a latch portion that controls switch state, and including the further step of combining the active control processor module latch portion with the standby control processor module latch portion to provide a bistable latch that prevents the control processor modules from being simultaneously active.

34. The method of claim 33 wherein the control processor modules are mounted in a card cage in the switch, and including the further step of automatically activating the standby control processor module upon removal of the active control processor module from the card cage.

* * * * *